US012418675B2

(12) United States Patent
Ahn

(10) Patent No.: US 12,418,675 B2
(45) Date of Patent: *Sep. 16, 2025

(54) VIDEO CODING METHOD AND DEVICE USING MERGE CANDIDATE

(71) Applicant: INTELLECTUAL DISCOVERY CO., LTD., Seoul (KR)

(72) Inventor: Yong Jo Ahn, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,892

(22) Filed: Mar. 27, 2023

(65) Prior Publication Data
US 2023/0308678 A1    Sep. 28, 2023

Related U.S. Application Data

(63) Continuation of application No. 17/257,052, filed as application No. PCT/KR2019/008031 on Jul. 2, 2019, now Pat. No. 11,671,619.

(30) Foreign Application Priority Data
Jul. 2, 2018    (KR) .......................... 10-2018-0076540

(51) Int. Cl.
*H04N 19/52* (2014.01)
*H04N 19/126* (2014.01)
(Continued)

(52) U.S. Cl.
CPC ........... *H04N 19/52* (2014.11); *H04N 19/126* (2014.11); *H04N 19/159* (2014.11); *H04N 19/176* (2014.11)

(58) Field of Classification Search
None
See application file for complete search history.

(56) References Cited

U.S. PATENT DOCUMENTS

| 11,394,959 B2 * | 7/2022 | Lee ....................... H04N 19/137 |
| 11,671,619 B2 * | 6/2023 | Ahn ....................... H04N 19/159 |
| | | 375/240.16 |

(Continued)

FOREIGN PATENT DOCUMENTS

| CN | 103250416 A | 8/2013 |
| CN | 103733624 A | 4/2014 |

(Continued)

OTHER PUBLICATIONS

Office Action for CN 201980044560.8 by China National Intellectual Property Administration dated Mar. 24, 2023.

(Continued)

*Primary Examiner* — Lindsay J Uhl
(74) *Attorney, Agent, or Firm* — BROADVIEW IP LAW, PC

(57) ABSTRACT

In a video encoding/decoding method and device according to the present invention, a merge candidate of a current block may be determined, a merge candidate list may be configured on the basis of the merge candidate, motion information of the current block may be derived from the merge candidate list, and the motion information may be used to perform inter prediction of the current block.

7 Claims, 9 Drawing Sheets

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 2013/0266070 | A1* | 10/2013 | Sato | H04N 19/52 375/240.16 |
| 2017/0078699 | A1 | 3/2017 | Park et al. | |
| 2018/0184117 | A1* | 6/2018 | Chen | H04N 19/52 |
| 2020/0036992 | A1* | 1/2020 | Lim | H04N 19/119 |
| 2020/0359048 | A1* | 11/2020 | Abe | H04N 19/176 |
| 2021/0176492 | A1* | 6/2021 | Kim | H04N 19/157 |

FOREIGN PATENT DOCUMENTS

| | | |
|---|---|---|
| JP | 2014-529254 A | 10/2014 |
| JP | 2016-165135 A | 9/2016 |
| KR | 10-1559876 B1 | 10/2015 |
| KR | 10-2017-0002460 A | 1/2017 |
| KR | 10-2017-0122280 A | 11/2017 |
| KR | 10-2018-0037600 A | 4/2018 |

OTHER PUBLICATIONS

International Search Report for PCT/KR2019/008031 dated Oct. 16, 2019.

Office Action for KR 10-2019-0079248 by Korean Intellectual Property Office dated Jun. 16, 2025.

Toma, Tadamasa et al., "Description of SDR video coding technology proposal by Panasonic", Joint Video Experts Team (JVET) of ITU-T SG 16 WP 3 and ISO/IEC JTC 1/SC 29/WG 11, JVET-J0020-v1, Apr. 2018.

Liao, Ru-Ling et al., "CE10.3.1.b: Triangular prediction unit mode", Joint Video Exploration Team (JVET) of ITU-T SG 16 WP 3 and ISO/IEC JTC 1/SC 29/WG 11, JVET-L0124-v2, Oct. 2018.

* cited by examiner

FIG. 8

| 8 | 8 | 8 | 8 | 8 | 8 | 8 | 8 | 8 | 7 | 7 | 6 | 6 | 4 | 4 |
|---|---|---|---|---|---|---|---|---|---|---|---|---|---|---|
| 8 | 8 | 8 | 8 | 8 | 8 | 8 | 8 | 7 | 7 | 6 | 6 | 4 | 4 | 2 | 2 |
| 8 | 8 | 8 | 8 | 8 | 8 | 7 | 7 | 6 | 6 | 4 | 4 | 2 | 2 | 1 | 1 |
| 8 | 8 | 8 | 8 | 7 | 7 | 6 | 6 | 4 | 4 | 2 | 2 | 1 | 1 | 0 | 0 |
| 8 | 8 | 7 | 7 | 6 | 6 | 4 | 4 | 2 | 2 | 1 | 1 | 0 | 0 | 0 | 0 |
| 7 | 7 | 6 | 6 | 4 | 4 | 2 | 2 | 1 | 1 | 0 | 0 | 0 | 0 | 0 |
| 6 | 6 | 4 | 4 | 2 | 2 | 1 | 1 | 0 | 0 | 0 | 0 | 0 | 0 | 0 |
| 4 | 4 | 2 | 2 | 1 | 1 | 0 | 0 | 0 | 0 | 0 | 0 | 0 | 0 | 0 |

| 0 | 0 | 0 | 0 | 0 | 0 | 0 | 0 | 0 | 1 | 1 | 2 | 2 | 4 | 4 |
|---|---|---|---|---|---|---|---|---|---|---|---|---|---|---|
| 0 | 0 | 0 | 0 | 0 | 0 | 0 | 0 | 1 | 1 | 2 | 2 | 4 | 4 | 6 | 6 |
| 0 | 0 | 0 | 0 | 0 | 0 | 1 | 1 | 2 | 2 | 4 | 4 | 6 | 6 | 7 | 7 |
| 0 | 0 | 0 | 0 | 1 | 1 | 2 | 2 | 4 | 4 | 6 | 6 | 7 | 7 | 8 | 8 |
| 0 | 0 | 1 | 1 | 2 | 2 | 4 | 4 | 6 | 6 | 7 | 7 | 8 | 8 | 8 | 8 |
| 1 | 1 | 2 | 2 | 4 | 4 | 6 | 6 | 7 | 7 | 8 | 8 | 8 | 8 | 8 |
| 2 | 2 | 4 | 4 | 6 | 6 | 7 | 7 | 8 | 8 | 8 | 8 | 8 | 8 | 8 |
| 4 | 4 | 6 | 6 | 7 | 7 | 8 | 8 | 8 | 8 | 8 | 8 | 8 | 8 | 8 |

FIG. 9

VIDEO CODING METHOD AND DEVICE USING MERGE CANDIDATE

CROSS-REFERENCE TO RELATED APPLICATIONS

This application is a continuation of U.S. patent application Ser. No. 17/257,052 filed on Dec. 30, 2020, which is a National Stage of International Application No. PCT/KR2019/008031 filed Jul. 2, 2019, which claims priority under U.S.C. § 119(a) to Korean Patent Application No. 10-2018-0076540 filed on Jul. 2, 2018.

TECHNICAL FIELD

The present invention relates to video coding techniques. In particular, the present invention relates to motion prediction and compensation among video coding techniques.

BACKGROUND ART

The market demand for high-resolution video is increasing, and accordingly, a technology capable of efficiently compressing high-resolution images is required. In response to such market demand, ISO/IEC's Moving Picture Expert Group (MPEG) and ITU-T's VCEG (Video Coding Expert Group) jointly formed JCT-VC (Joint Collaborative Team on Video Coding), High Efficiency Video Coding (HEVC) video compression standard was developed in January 2013, and research and development for the next generation compression standard have been actively conducted.

Video compression is largely composed of intra prediction, inter prediction, transform, quantization, entropy coding, in-loop filter. Meanwhile, as the demand for high-resolution images increases, the demand for 3D image contents as a new image service is also increasing. Discussion is underway on a video compression technique for effectively providing 3D video contents with high-resolution and ultra-high-resolution.

DISCLOSURE

Technical Problem

An object of the present disclosure is to provide an image encoding/decoding method and apparatus with improved efficiency.

In addition, an object of the present invention is to provide a method and apparatus for dividing a coded block into a quadrangular, triangular, or arbitrary partition.

In addition, an object of the present invention is to provide a method and apparatus for adaptively constructing a merge candidate list of a current block.

An object of the present invention is to provide a method and apparatus for limiting a prediction direction of a block to which diagonal motion division is applied.

In addition, an object of the present invention is to provide a method and apparatus for weighted prediction of a block to which diagonal motion division is applied.

In addition, an object of the present disclosure is to provide a computer-readable recording medium storing a bitstream generated by the image encoding method/apparatus.

Technical Solution

A video encoding/decoding method and apparatus according to the present invention may determine a merge candidate of a current block, construct a merge candidate list based on the merge candidate, derive motion information of the current block from the merge candidate list, and perform inter prediction of the current block using the motion information.

In the video encoding/decoding method and apparatus according to the present invention, the current block is divided into two partitions through diagonal motion division.

In the video encoding/decoding method and apparatus according to the present invention, the diagonal motion division is performed based on a flag indicating whether to perform the diagonal motion division for the current block.

In the video encoding/decoding method and apparatus according to the present invention, the flag is derived based on a predetermined encoding parameter, and the encoding parameter includes at least one of a slice type, a type of an inter mode, a block size/shape, or a ratio of a width and a height of a block.

In the video encoding/decoding method and apparatus according to the present invention, the two partitions belonging to the current block share the constructed merge candidate list.

In the video encoding/decoding method and apparatus according to the present invention, the merge candidate list includes at least one of a spatial merge candidate, a temporal merge candidate, or a combined merge candidate.

In the video encoding/decoding method and apparatus according to the present invention, the motion information is derived based on a merge index of the current block, and the merge index is signaled, from an encoding apparatus, for each of the two partitions.

In the video encoding/decoding method and apparatus according to the present invention, a pixel of the current block is predicted using at least one of a first reference block of a first partition or a second reference block of a second partition.

In the video encoding/decoding method and apparatus according to the present invention, the pixel of the current block is predicted using only one of a first pixel in the first reference block or a second pixel in the second reference block or predicted by weighted average of the first pixel in the first reference block and the second pixel in the second reference block.

In the video encoding/decoding method and apparatus according to the present invention, a weight for the weighted average is one of [7:1], [6:2], [4:4], [2:6], or [1:7].

In the video encoding/decoding method and apparatus according to the present invention, the weight is selectively applied according to a position of a pixel in the current block.

Advantageous Effects

According to the present invention, encoding/decoding efficiency can be improved through block division of various types.

Further, according to the present invention, by using an adaptive merge candidate list, it is possible to improve the encoding/decoding efficiency of motion information.

The present invention can efficiently reduce a memory bandwidth by limiting the prediction direction of a block to which diagonal motion division is applied.

In addition, the present invention can reduce artifacts near a division boundary through weighted prediction of a block to which diagonal motion division is applied.

Further, a computer-readable recording medium for storing a bitstream generated by the image encoding method/apparatus according to the present disclosure may be provided.

DESCRIPTION OF DRAWINGS

FIG. 8 is a diagram illustrating a concept of performing mask-based motion prediction and compensation for diagonal motion division shown in FIGS. 3A-3B.

FIG. 9 is an embodiment to which another weight of the proposed mask-based block division method shown in FIG. 8 is applied.

BEST MODE

Figure 1:
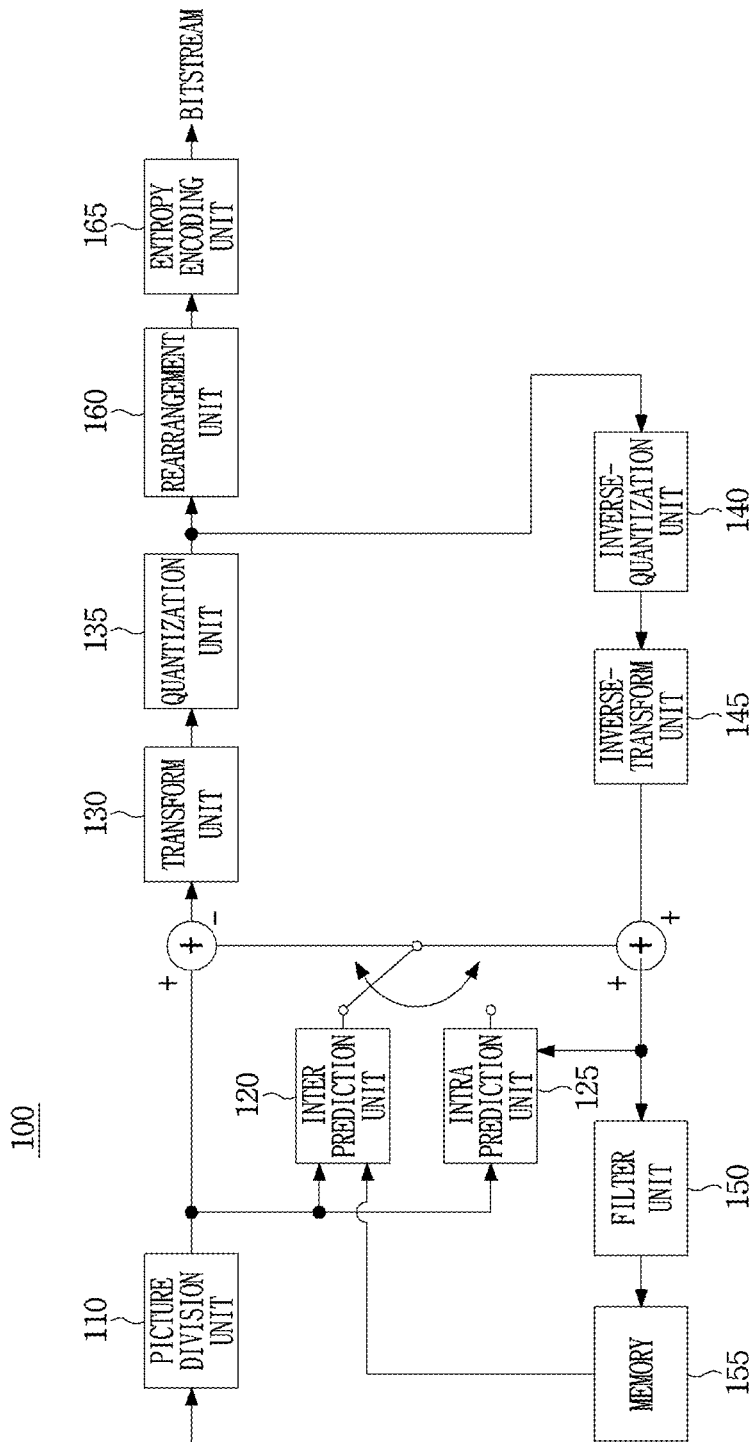
FIG. 1 is a block diagram illustrating an image encoding apparatus according to the present disclosure.

A video encoding/decoding method and apparatus according to the present invention may determine a merge candidate of a current block, construct a merge candidate list based on the merge candidate, derive motion information of the current block from the merge candidate list, and perform inter prediction of the current block using the motion information.

In the video encoding/decoding method and apparatus according to the present invention, the current block is divided into two partitions through diagonal motion division.

In the video encoding/decoding method and apparatus according to the present invention, the diagonal motion division is performed based on a flag indicating whether to perform the diagonal motion division for the current block.

In the video encoding/decoding method and apparatus according to the present invention, the flag is derived based on a predetermined encoding parameter, and the encoding parameter includes at least one of a slice type, a type of an inter mode, a block size/shape, or a ratio of a width and a height of a block.

In the video encoding/decoding method and apparatus according to the present invention, the two partitions belonging to the current block share the constructed merge candidate list.

In the video encoding/decoding method and apparatus according to the present invention, the merge candidate list includes at least one of a spatial merge candidate, a temporal merge candidate, or a combined merge candidate.

In the video encoding/decoding method and apparatus according to the present invention, the motion information is derived based on a merge index of the current block, and the merge index is signaled, from an encoding apparatus, for each of the two partitions.

In the video encoding/decoding method and apparatus according to the present invention, a pixel of the current block is predicted using at least one of a first reference block of a first partition or a second reference block of a second partition.

In the video encoding/decoding method and apparatus according to the present invention, the pixel of the current block is predicted using only one of a first pixel in the first reference block or a second pixel in the second reference block or predicted by weighted average of the first pixel in the first reference block and the second pixel in the second reference block.

In the video encoding/decoding method and apparatus according to the present invention, a weight for the weighted average is one of [7:1], [6:2], [4:4], [2:6], or [1:7].

In the video encoding/decoding method and apparatus according to the present invention, the weight is selectively applied according to a position of a pixel in the current block.

MODE FOR DISCLOSURE

Embodiments of the present disclosure will be described in detail with reference to the accompanying drawings in the present specification so that those of ordinary skill in the art can easily implement the present disclosure. The present disclosure may, however, be embodied in many different forms and should not be construed as limited to the embodiments set forth herein. In order to clearly illustrate the present disclosure, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, terms such as first and second may be used to describe various components, but the components should not be limited by the terms. These terms are used only for the purpose of distinguishing one component from another component.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present disclosure may be added to the second embodiment of the present disclosure, or may replace some of the components or steps of the second embodiment.

In addition, the components shown in the embodiments of the present disclosure are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present disclosure without departing from the essence of the present disclosure.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, a apparatus included in a server terminal such as a TV application server and a service server, and may mean a user terminal such as various apparatus, a communication apparatus such as a communication modem for performing communication with a wired/wireless communication network, a memory for storing various programs and data for decoding an image or performing an inter prediction or intra prediction for decoding, various apparatus equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block' and 'a block'.

Hereinafter, exemplary embodiments of the present disclosure will be described in detail with reference to the accompanying drawings. In describing the present disclosure, redundant description of the same components will be omitted.

FIG. 1 is a block diagram showing an image encoding apparatus according to the present disclosure.

Referring to FIG. 1, the conventional image encoding apparatus 100 includes a picture division unit 110, a prediction unit 120, 125, a transform unit 130, a quantization unit 135, a rearrangement unit 160, and an entropy encoding unit 165, an inverse quantization unit 140, an inverse transform unit 145, a filter unit 150, and a memory 155.

The picture division unit 110 may divide the input picture into at least one processing unit. In this case, the processing unit may be a prediction unit (PU), a transform unit (TU), or a coding unit (CU). Hereinafter, in an embodiment of the present disclosure, a coding unit may be used as a meaning of a unit that performs encoding, or may be used as a meaning of a unit that performs decoding.

The prediction unit may be obtained by dividing in a shape such as at least one square or rectangle of the same size within one coding unit. One of prediction units divided within one coding unit may be obtained by dividing to have a different shape and/or size from the other prediction unit. In generating a prediction unit that performs intra prediction based on a coding unit, when it is not a minimum coding unit, intra prediction may be performed without dividing into a plurality of prediction units N×N.

The prediction units 120 and 125 may include an inter prediction unit 120 that performs inter prediction, and an intra prediction unit 125 that performs intra prediction. Whether to use inter prediction or intra prediction for a prediction unit may be determined, and specific information (e.g., intra prediction mode, motion vector, reference picture, etc.) according to each prediction method may be determined. The residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder.

The inter prediction unit 120 may predict a prediction unit based on information of at least one of a previous picture or a subsequent picture of the current picture, and in some cases, predict a prediction unit based on information of some regions, which encoding has been completed, in the current picture. The inter prediction unit 120 may include a reference picture interpolation unit, a motion prediction unit, and a motion compensation unit.

The reference picture interpolation unit may receive reference picture information from the memory 155 and generate pixel information of an integer pixel or less in the reference picture. In the case of a luma pixel, a DCT-based 8-tap interpolation filter (DCT-based interpolation filter) having different filter coefficients may be used to generate pixel information of an integer pixel or less in units of a ¼ pixels. In case of a chroma signal, a DCT-based 4-tap interpolation filter (DCT-based interpolation filter) having different filter coefficients may be used to generate pixel information of an integer pixel or less in units of ⅛ pixels.

Figure 3A:
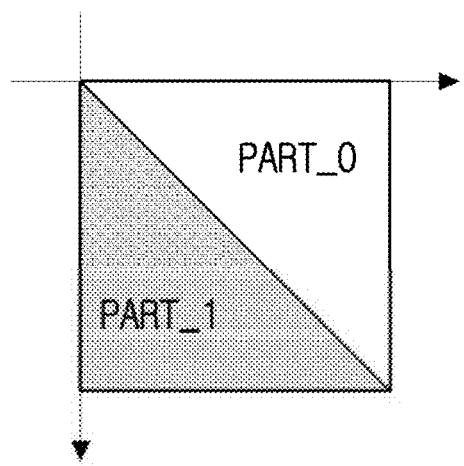
FIGS. 3A-3B illustrate a method of dividing a square or rectangular block into a triangular shape using two types of diagonal lines proposed in the present invention.
Figure 3B:
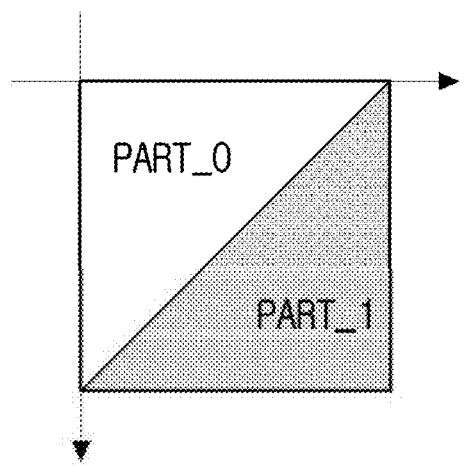

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in units of ½ or ¼ pixels based on the interpolated pixels. The motion prediction unit may predict a current prediction unit by differently using a motion prediction method. Various methods such as a skip mode, a merge mode, an AMVP (Advanced Motion Vector Prediction) mode, an intra block copy mode, and an affine mode may be used as the motion prediction method. With reference to FIGS. 3A-3B to 9, inter prediction based on the merge mode will be described in detail.

The intra prediction unit 125 may generate a prediction unit based on reference pixel information around a current block, which is pixel information in a current picture. When the neighboring block of the current prediction unit is a block that performs inter prediction and the reference pixel is a pixel that performs inter prediction, the reference pixel included in the block that performs inter prediction may be used by replacing it with reference pixel information of a block that performs intra prediction around it. That is, when the reference pixel is not available, the unavailable reference pixel information may be used by replacing with at least one reference pixel among the available reference pixels.

In addition, a residual block including residual information that is a difference value between the prediction unit that performs prediction based on the prediction units generated by the prediction units 120 and 125 and the original block of the prediction unit may be generated. The generated residual block may be input to the transform unit 130.

The transform unit 130 may transform a residual block including residual information between a prediction unit generated by the prediction units 120 and 125 and the original block by using the transform method such as DCT (Discrete Cosine Transform), DST (Discrete Sine Transform), and KLT. Whether DCT, DST, or KLT is applied to transform the residual block may be determined based on intra prediction mode information of a prediction unit used to generate the residual block.

The quantization unit 135 may quantize values transformed to the frequency domain by the transform unit 130. The quantization coefficient may vary depending on the block or the importance of the image. The value calculated by the quantization unit 135 may be provided to the inverse quantization unit 140 and the rearrangement unit 160.

The rearrangement unit 160 may perform the rearrangement of the coefficient value for the quantized residual value.

The rearrangement unit 160 may change coefficients of 2-dimensional block form into 1-dimensional vector form through a coefficient scanning method. For example, the rearrangement unit 160 may change into a 1-dimensional vector form by scanning from a DC coefficient to a coefficient in a high frequency region according to a Zig-Zag Scan method. Depending on the size of the transform unit and the intra prediction mode, a vertical scan of scanning coefficients of two-dimensional block form in a column direction and a horizontal scan of scanning coefficients of two-dimensional block form in a row direction may be used instead of a zig-zag scan. That is, depending on the size of the transform unit and the intra prediction mode, it may be determined which one of a zigzag scan, a vertical scan, and a horizontal scan is used.

The entropy encoding unit 165 may perform entropy-encoding based on values calculated by the rearrangement unit 160. Various encoding methods, such as exponential Golomb, CAVLC (Context-Adaptive Variable Length Coding), and CABAC (Context-Adaptive Binary Arithmetic Coding), may be used for entropy-encoding. In relation to this, the entropy encoding unit 165 may encode residual value coefficient information of a coding unit from the rearrangement unit 160 and the prediction units 120 and 125. In addition, according to the present disclosure, information indicating that the motion information is derived and used in the decoder side and information on a method used to derive the motion information may be signaled from the encoder.

The inverse quantization unit 140 and the inverse transform unit 145 inverse-quantize the values quantized by the quantization unit 135 and inverse-transform the values transformed by the transform unit 130. The reconstructed block may be generated by combining the residual value generated by the inverse quantization unit 140 and the inverse transform unit 145 with the prediction unit predicted through the motion estimation unit, the motion compensation unit, and the intra prediction unit included in the prediction units 120 and 125.

The filter unit 150 may include at least one of a deblocking filter, an offset modification unit, and an adaptive loop filter (ALF). The deblocking filter may remove block distortion caused by boundary between blocks in the reconstructed picture. The offset modification unit may correct an offset from the original image in units of pixels for the deblocking-filtered image. In order to perform offset modification for a specific picture, after classifying the pixels included in the image into a certain number of regions and determining the region to which the offset is applied, a method of applying the offset to the region offset or a method of applying the offset by considering edge information of each pixel may be used. ALF (Adaptive Loop Filtering) may be performed based on a value obtained by comparing a filtered reconstructed image with an original image. After classifying the pixels included in the image into a predetermined group, one filter to be applied to the group may be determined to perform filtering differently for each group.

The memory 155 may store the reconstructed block or picture output from the filter unit 150, and the stored reconstructed block or picture may be provided to the prediction units 120 and 125 when performing inter prediction.

Figure 2:
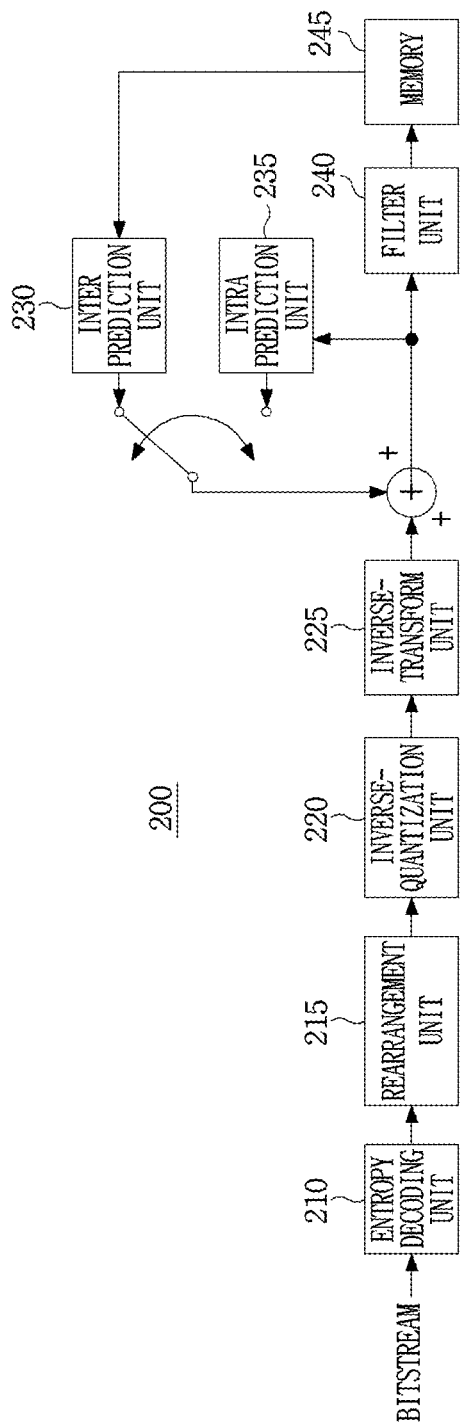
FIG. 2 is a block diagram illustrating an image decoding apparatus according to the present disclosure.

FIG. 2 is a block diagram showing an image decoding apparatus according to the present disclosure.

Referring to FIG. 2, the image decoder 200 may include an entropy decoding unit 210, a rearrangement unit 215, an inverse quantization unit 220, an inverse transform unit 225, a prediction unit 230, 235, and a filter unit 240, a memory 245.

When an image bitstream is input from the image encoder, the input bitstream may be decoded in a procedure opposite to that of the image encoder.

The entropy decoding unit 210 may perform entropy-decoding in a procedure opposite to that performed by entropy-encoding in the entropy encoding unit of the image encoder. For example, various methods corresponding to the method performed in the image encoder such as Exponential Golomb (CAVLC), Context-Adaptive Variable Length Coding (CAVLC), and Context-Adaptive Binary Arithmetic Coding (CABAC) may be applied.

The entropy decoding unit 210 may decode information related to intra prediction and inter prediction performed by the encoder.

The rearrangement unit 215 may perform rearrangement of the bitstream entropy-decoded by the entropy decoding unit 210 based on a rearrangement method of the encoding unit. The coefficients of a 1-dimensional vector form may be rearranged into coefficients of a 2-dimensional block form again.

The inverse quantization unit 220 may perform inverse quantization based on the quantization parameter provided by the encoder and the coefficients of the rearranged block.

The inverse transform unit 225 may perform inverse transform, that is, inverse DCT, inverse DST, and inverse KLT, corresponding to transforms performed by the transform unit, that is, DCT, DST, and KLT for the quantization results performed by the image encoder. The inverse transform may be performed based on the transmission unit determined by the image encoder. In the inverse transform unit 225 of the image decoder, a transform type (for example, DCT, DST, KLT) may be selectively performed according to a plurality of information such as a prediction method, a size of a current block, and a prediction direction.

The prediction units 230 and 235 may generate a prediction block based on prediction block generation related information provided by the entropy decoding unit 210 and previously decoded block or picture information provided by the memory 245.

As described above, when a size of the prediction unit and a size of the transform unit are the same in performing intra prediction in the same manner as in the image encoder, the intra prediction of the prediction unit may be performed based on pixels located on the left, the top-left and the top of the prediction unit. However, when the size of the prediction unit and the size of the transform unit are different in performing intra prediction, the intra prediction may be performed using a reference pixel based on the transform unit. In addition, the intra prediction using N×N division may be used only for the minimum coding unit.

The prediction unit 230 and 235 may include at least one of a prediction unit determination unit, an inter prediction unit, and an intra prediction unit. The prediction unit determination unit may receive various information from the entropy decoding unit 210 such as prediction unit information, prediction mode information of an intra prediction method, and motion prediction related information of an inter prediction method, classify the prediction unit from the current coding unit, and determine whether the prediction unit performs inter prediction or intra prediction. On the other hand, if the motion prediction related information for the inter prediction is not transmitted, and instead, information indicating that the motion information is derived and used in the decoder side and information about a method used to derive the motion information is transmitted from the encoder 100, the prediction unit determination unit determines the prediction performance of the inter prediction unit 230 based on the information transmitted from the encoder 100.

The inter prediction unit 230 may perform inter prediction for a current prediction unit based on information included in at least one of a previous picture or a subsequent picture of the current picture including the current prediction unit, by using information required for inter prediction of the current prediction unit provided by the image encoder. In order to perform inter prediction, it may be determined whether a motion prediction method of a prediction unit included in a coding unit is a skip mode, a merge mode, an AMVP mode, an intra block copy mode, or an affine mode. With reference to FIGS. 3A-3B to 9, inter prediction based on the merge mode will be described in detail.

The intra prediction unit 235 may generate a prediction block based on pixel information in the current picture. When the prediction unit is a prediction unit that has performed intra prediction, intra prediction may be performed based on intra prediction mode information of a prediction unit provided by an image encoder. The intra prediction unit 235 may include an adaptive intra smoothing (AIS) filter, a reference pixel interpolation unit, and a DC filter. The AIS filter is a part that performs filtering on the reference pixel of the current block and may be applied by determining whether to apply the filter according to the prediction mode of the current prediction unit. AIS filtering may be performed on a reference pixel of a current block by using prediction mode and AIS filter information of a prediction unit provided by an image encoder. When the prediction mode of the current block is a mode that does not perform AIS filtering, the AIS filter may not be applied.

When the prediction mode of the prediction unit is the prediction unit that performs intra prediction based on the pixel value obtained by interpolating the reference pixel, the reference pixel interpolation unit may interpolate the reference pixel to generate a reference pixel of an integer pixel or less. When the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode.

The reconstructed block or picture may be provided to the filter unit 240. The filter unit 240 may include a deblocking filter, an offset modification unit, and an ALF.

Information about whether a deblocking filter is applied to a corresponding block or picture and information about whether a strong filter is applied or a weak filter is applied in applying the deblocking filter may be provided from a video encoder. In the deblocking filter of the video decoder, information related to the deblocking filter provided by the video encoder may be provided, and the video decoder may perform deblocking filtering on the corresponding block.

The offset modification unit may perform offset modification on the reconstructed image based on a type of offset modification and offset value information applied to the image during encoding. ALF may be applied to a coding unit based on information on whether to apply ALF, ALF coefficient information, and the like, provided by an encoder. This ALF information may be provided from a specific parameter set.

The memory 245 may store the reconstructed picture or block so that it can be used as a reference picture or a reference block, and may also provide the reconstructed picture to an output unit.

FIGS. 3A-3B illustrate a method of dividing a square or rectangular block into a triangular shape using two types of diagonal lines proposed in the present invention.

FIG. 3A illustrates an example of dividing a square or rectangular block into two triangular blocks using a diagonal line connecting the top-left and the bottom-right of the block.

FIG. 3B illustrates an example of dividing a square or rectangular block into two triangular blocks by using a diagonal line connecting the top-right and the bottom-left of the block.

The two triangular blocks divided in FIGS. 3A and 3B may be referred to as a first partition and a second partition according to their positions.

In FIG. 3A, a diagonal line connecting the top-left and the bottom-right of the block may be expressed as Equation 1 with the top-left position of the block as an origin.

$$f(x,y)=hx-wy \qquad \text{[Equation 1]}$$

In Equation 1, w means the width of the block, and h means the height of the block.

In FIG. 3B, a diagonal line connecting the top-right and the bottom-left of the block may be expressed as Equation 2 with the top-left position of the block as an origin.

$$f(x,y)=w(h-y)-hx \qquad \text{[Equation 2]}$$

In Equation 2, w means the width of the block, and h means the height of the block.

For the aforementioned diagonal motion division, a flag indicating whether diagonal motion division is performed for one coding unit (CU) may be used. For example, if the flag is the first value, diagonal motion division may be performed, otherwise, diagonal motion division may not be performed.

The flag may be encoded and signaled by an encoding apparatus, or may be derived by a decoding apparatus based on a predetermined encoding parameter. Here, the encoding parameter may include a slice type, a type of an inter mode, a block size/shape, a ratio between a width and a height of a block, and the like.

For example, the flag may be set as the first value only when the slice type to which the current block belongs is a B slice. Alternatively, the flag may be set as the first value only when the slice type to which the current block belongs is not an I slice. Alternatively, the flag may be set to the first value only when the inter mode of the current block is at least one of a merge mode, a skip mode, an AMVP mode, or an affine mode. Alternatively, the flag may be set as the first value only when at least one of the width or the height of the current block is greater than or equal to a predetermined threshold size. Here, the threshold size may be 4, 8, 16 or more. Alternatively, the flag may be set to the first value only when the number of samples (W*H) belonging to the current block is greater than or equal to a predetermined threshold number. Here, the threshold number may be 32, 64 or more. Alternatively, the flag may be set to the first value only when the ratio of the width and the height of the current block is less than a predetermined threshold value. Here, the threshold value may be 4, 8 or more.

When the flag indicates that diagonal motion division is performed, direction information of diagonal motion division may be signaled. If the direction information is the first value, the current block may be divided based on a diagonal line connecting the top-left and the bottom-right (hereinafter referred to as a first diagonal line), otherwise, the current block may be divided based on a diagonal line connecting the top-right and the bottom-left (hereinafter referred to as a second diagonal line).

The information for diagonal motion division may not be signaled according to mode information of the current block. In this case, when the mode information of the current block is an intra prediction mode, it may not be signaled.

In addition, the information for diagonal motion division may not be signaled according to size information of the current block. The size information of the current block may be defined as a size of a width or height, a ratio of a width and a height, a product of a width and a height, and the like. For example, if the width or height of the current block is less than 8, the current block may not use diagonal motion division.

Alternatively, as an additional embodiment, when the width or height of the current block is less than 8 or the ratio of the width and the height of the current block is greater than or equal to a specific ratio, the diagonal motion division may not be used. When the ratio of the width and the height is greater than 1:3 or 3:1 (e.g., 1:4 or 4:1, 1:8 or 8:1), the current block may not use diagonal motion division. In this case, diagonal motion division information may not be signaled.

Figure 4:
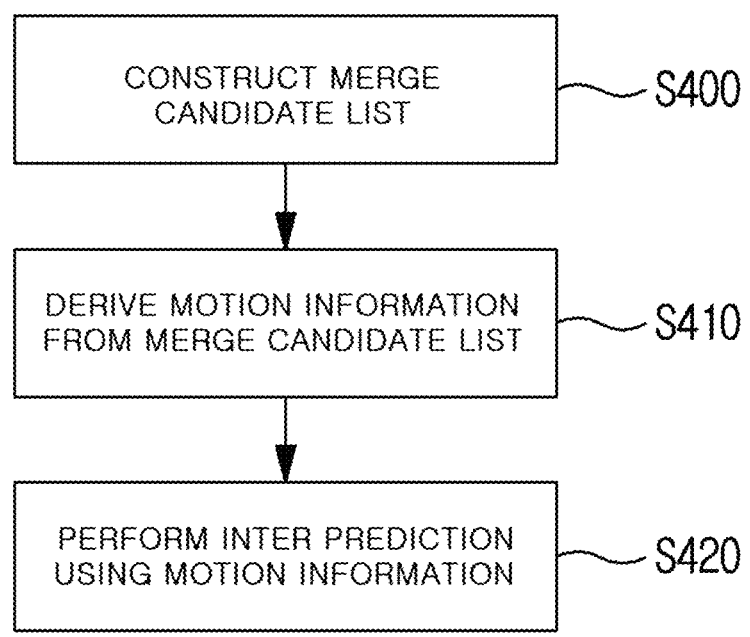
FIG. 4 illustrates an inter prediction method based on a merge mode as an embodiment to which the present invention is applied.

FIG. 4 illustrates an inter prediction method based on a merge mode as an embodiment to which the present invention is applied.

Referring to FIG. 4, a merge candidate list of a current block may be constructed (S400).

The current block may have a square or non-square shape. The current block may be divided into two partitions through the aforementioned diagonal motion division. In this case, at least one of the two partitions may be a triangular partition.

A merge candidate of the current block may be determined, and a merge candidate list may be constructed based on the merge candidate. Two partitions of the current block may share one merge candidate list, or different merge candidate lists may be constructed for each partition. Here, the merge candidate list may include at least one of a spatial merge candidate or a temporal merge candidate of the current block.

Motion information of the spatial merging candidate may be derived from motion information of a spatial neighboring block of the current block. Here, the spatial neighboring block is a block belonging to the same picture as the current block, and may mean a block adjacent to the current block. The spatial neighboring block may include a block adjacent to at least one of the left, top, top-right, bottom-left, or top-left of the current block. The top-left neighboring block may be used only when at least one of the blocks adjacent to the left, top, top-right, and bottom-left is not available.

Motion information of the temporal merge candidate may be derived from motion information of a temporal neighboring block of the current block. The temporal neighboring block is a block belonging to a picture different from the current block, and may be defined as a block at the same position as the current block. Here, the block at the same position may mean at least one of a block BR adjacent to the bottom-right corner of the current block, a block CTR including the position of the center sample of the current block, or a block TL including the position of the top-left sample of the current block.

Alternatively, the block at the same position may mean a block including a position shifted by a predetermined disparity vector from the position of the upper left sample of the current block. Here, the disparity vector may be determined based on any one of the motion vectors of the spatial neighboring blocks described above. For example, the disparity vector may be set as a motion vector of a left neighboring block or a motion vector of an upper neighboring block. Alternatively, the disparity vector may be determined based on a combination of at least two of the motion vectors of the spatial neighboring blocks described above. The combination may include a process of calculating a maximum value, a minimum value, a median value, and a weighted average value. For example, the disparity vector may be set as a median or average value between a motion vector of a left neighboring block and a motion vector of a lower left neighboring block.

The motion vector and the reference picture index of the temporal merge candidate may be derived from the motion vector and the reference picture index of the temporal neighboring block, respectively. Alternatively, the motion vector of the temporal merge candidate is derived as the motion vector of the temporal neighboring block, and the reference picture index of the temporal merge candidate is set to a default value (e.g., 0) pre-committed to the decoding apparatus regardless of the temporal neighboring block.

The merge candidate list may further include at least one of a combined merge candidate or a merge candidate having a zero motion vector.

The combined merging candidate may be derived by combining n merging candidates belonging to the pre-generated merging candidate list. Here, n may be an integer of 2, 3, 4 or more. The number n of merge candidates to be combined may be a fixed value pre-committed to the encoding/decoding apparatus, or may be encoded and signaled by the encoding apparatus. The signaling may be performed in at least one unit of a sequence, a picture, a slice, a tile, a sub-tile (brick, brick), or a predetermined block. The number n of merge candidates to be combined may be variably determined based on the number of remaining merge candidates. Here, the number of remaining merge candidates may mean a difference between the maximum number of merge candidates that can be included in the merge candidate list and the current number of merge candidates in the merge candidate list. The maximum number may be a number pre-committed to an encoding/decoding apparatus, or may be encoded and signaled by an encoding apparatus. The current number may mean the number of merge candidates constructed before adding the combined merge candidate. For example, when the number of remaining merge candidates is 1, two merge candidates are used, and when the number of remaining merge candidates is greater than 1, three or more merge candidates may be used.

The positions of the n merge candidates may be pre-determined positions in the merge candidate list. For example, indexes 0 to (k−1) may be allocated for each merge candidate belonging to the merge candidate list. Here, k may mean the total number of merge candidates included in the merge candidate list. In this case, the positions of the n merge candidates may correspond to indexes 0 to index (n−1) in the merge candidate list. For example, when n=2, the merge candidate to be combined may be derived using only the first merge candidate (index=0) and the second merge candidate (index=1) in the merge candidate list.

Alternatively, the n merge candidates may be determined in consideration of a prediction direction of each merge candidate included in the merge candidate list. For example, among the merge candidates included in the merge candidate list, only a merge candidate corresponding to a bi-directional prediction may be selectively used, or only a merge candidate corresponding to a uni-directional prediction may be selectively used.

The combined merging candidate may be derived using both a spatial merging candidate and a temporal merging candidate, or may be derived using only one of a spatial merging candidate or a temporal merging candidate.

The combined merge candidate may be added after the spatial/temporal merge candidate in the merge candidate list. That is, the index of the combined merge candidate may be greater than the index of the spatial/temporal merge candidate. Alternatively, the combined merge candidate may be added between the spatial merge candidate and the temporal merge candidate in a merge candidate list. That is, the index of the combined merge candidate may be greater than the index of the spatial merge candidate and may be less than the index of the temporal merge candidate. Alternatively, the position of the combined merge candidate may be variably determined in consideration of the prediction direction of the combined merge candidate. The positions of the combined merge candidates in the merge candidate list may be rearranged depending on whether the prediction direction of the combined merge candidate is the bi-directional prediction. For example, when the combined merging candidate corresponds to the bi-directional prediction, an index less than the spatial or temporal merging candidate may be allocated. Otherwise, an index greater than the spatial or temporal merging candidate may be allocated.

Hereinafter, for convenience of description, a method of deriving a combined merge candidate based on two merge candidates will be described.

The motion information of the combined merge candidate may be derived by a weighted average of motion information of the first merge candidate and the second merge candidate. For example, the motion information in the LX direction of the combined merge candidate may be derived by a weighted average of the motion information in the LX direction of the first merge candidate and the motion information in the LX direction of the second merge candidate (X=0 or 1). However, the reference picture index in the LX direction of the combined merge candidate may be derived as a reference picture index in the LX direction of either the first merge candidate or the second merge candidate. For example, the reference picture index in the LX direction of the combined merge candidate may be derived using only the reference picture index in the LX direction of the first merge candidate. Here, the first merge candidate may have an index less than that of the second merge candidate.

The weight of the weighted average is [1:1], [1:2], [1:3], or [2:3], but is not limited thereto. The weight may be pre-defined in the encoding/decoding apparatus or derived from the decoding apparatus. In this case, the weight may be derived by considering at least one of a distance between the current picture and a reference picture of the merge candidate or a prediction direction of the merge candidate.

Alternatively, motion information in the L0 direction of the combined merge candidate may be derived from motion information in the L0 direction of the first merge candidate, and motion information in the L1 direction of the combined merge candidate may be derived from motion information in the L1 direction of the second merge candidate. Conversely, motion information in the L0 direction of the combined merge candidate may be derived from motion information in the L0 direction of the second merge candidate, and motion information in the L1 direction of the combined merge candidate may be derived from motion information in the L1 direction of the first merge candidate.

In this embodiment, the above-described motion information includes at least one of a prediction direction flag, a reference picture index, or a motion vector, and can be interpreted in the same manner in an embodiment described later.

A merge candidate list may be constructed based on the aforementioned merge candidate, which will be described in detail with reference to FIGS. 5 to 7.

Referring to FIG. 4, motion information of a current block may be derived from a merge candidate list (S410).

Specifically, a merge index of the current block may be signaled. The merge index may be information encoded to specify any one of a plurality of merge candidates included in the merge candidate list. The merge index may be signaled based on a flag indicating whether motion compensation based on diagonal motion division is performed. For example, when the flag indicates that motion compensation based on diagonal motion division may be performed (i.e., when the flag is a first value), the merge index is signaled; otherwise, the merge index may not be signaled. The flag is the same as described in FIGS. 3A-3B, and a detailed description thereof will be omitted.

The merge index may be signaled for each of the first partition and the second partition of the current block (Embodiment 1). The motion information of the first partition may be derived using motion information of the merge candidate having the same index as the signaled merge index (mergeIdx1) of the first partition. When the signaled merge index (mergeIdx2) of the second partition is less than mergeIdx1, motion information of the second partition may be derived using motion information of a merge candidate having the same index as mergeIdx2. On the other hand, when mergeIdx2 is greater than or equal to mergeIdx1, motion information of the second partition may be derived using motion information of a merge candidate having the same index as (mergeIdx2+1).

Alternatively, one merge index (mergeIdx) may be signaled for the current block (Embodiment 2). That is, the first partition and the second partition belonging to the current block may share the signaled mergeIdx. Motion information of the first and second partitions may be derived based on the motion information of the merge candidate specified by mergeIdx.

For example, when the merge candidate specified by mergeIdx corresponds to bi-directional prediction, the corresponding merge candidate may have motion information in the L0 direction and motion information in the L1 direction. In this case, the motion information of the first partition may be derived from one of motion information in the L0 direction and the motion information in the L1 direction, and the motion information of the second partition may be derived from the other. On the other hand, when the merge candidate specified by mergeIdx does not correspond to bi-directional prediction, the motion information of the first partition is derived as motion information of the merge candidate specified by mergeIdx, and the motion information of the second partition may be derived as motion information of the merge candidate specified by (mergeIdx+k). Here, k may be an integer having an absolute value of 1, 2, 3, or more.

Figure 7:
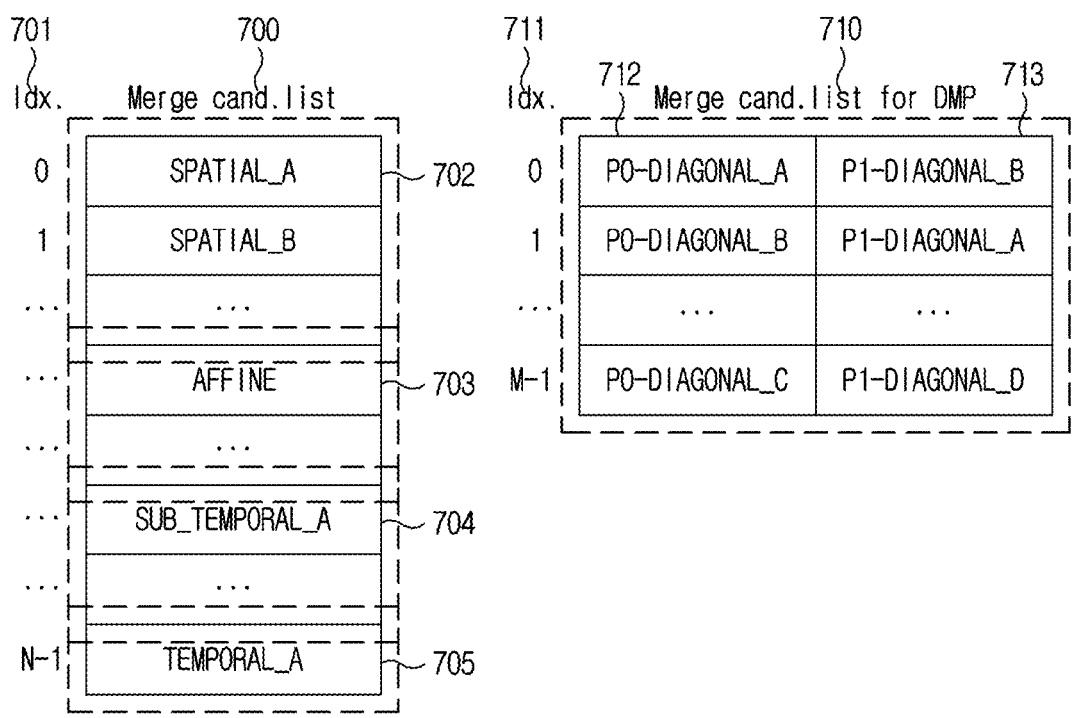
FIG. 7 is a diagram illustrating a concept of separately constructing a merge candidate list according to diagonal motion division.

Alternatively, the present embodiment may be applied to a case of constructing a merge candidate list by constructing the merge candidates of the first and second partitions into one set as shown in FIG. 7.

Motion information of the first and second partitions may be derived based on motion information of a pre-committed merge candidate in the merge candidate list (Embodiment 3). In this case, signaling of the merge index may be omitted. The pre-committed merge candidate may be a merge candidate having an index of 0. The motion information of the first and second partitions may be derived in consideration of whether the merge candidate having an index of 0 corresponds to bi-directional prediction, as described in Embodiment 2. Alternatively, the pre-committed merge candidate may be a merge candidate having the smallest index among merge candidates that correspond to bi-directional prediction. The merging candidate, which corresponds to a bidirectional prediction, may include at least one of a spatial/temporal merging candidate or a combined merging candidate. The motion information of the first and second partitions is derived based on motion information of the merge candidate, which corresponds to bi-directional prediction, as described in Embodiment 2 described above.

Motion information for each partition may be derived based on any one of the above-described Embodiments 1 to 3, or motion information for each partition may be derived based on a combination of at least two of the Embodiments 1 to 3. For example, motion information of the first partition may be derived based on the Embodiment 1, and motion information of the second partition may be derived based on the Embodiment 3.

In the case of diagonal motion division, in order to reduce the memory bandwidth, each partition may be restricted to perform only uni-directional prediction, and a detailed description of the restriction method will be given below.

By considering the merge index of the partition obtained by the diagonal motion division, it is possible to limit the partition to perform only uni-directional prediction (Embodiment 1).

For example, when the merge index (mergeIdx1) of the first partition is 0 or an even number (e.g., 2, 4, 6), the motion information of the first partition may be derived using motion information in the L0 direction of the merge candidate corresponding to mergeIdx1. However, the merge candidate corresponding to mergeIdx1 may not have motion information in the L0 direction. In this case, the motion information of the first partition may be derived using motion information in the L1 direction of the corresponding merge candidate.

On the other hand, when the merge index (mergeIdx1) of the first partition is an odd number (e.g., 1, 3, 5), the motion information of the first partition may be derived using motion information in the L1 direction of the merge candidate corresponding to mergeIdx1. However, the merge candidate corresponding to mergeIdx1 may not have motion information in the L1 direction. In this case, the motion information of the first partition may be derived using motion information in the L0 direction of the corresponding merge candidate.

The merge index (mergeIdx1) may be encoded and signaled by the encoding apparatus, derived based on the signaled merge index, or pre-committed to the decoding apparatus. The motion information of the second partition may be derived in the same manner as the above-described first partition, and a detailed description thereof will be omitted.

Conversely, if the merge index (mergeIdx1) of the first partition is 0 or an even number (e.g., 2, 4, 6), motion information of the first partition may be derived using motion information in the L1 direction of the merge candidate corresponding to mergeIdx1. If not, the motion information of the first partition may be derived using motion information in the L0 direction of the merge candidate corresponding to mergeIdx1.

Alternatively, depending on the position of the partition by the diagonal motion division, the corresponding partition may be limited to perform only uni-directional prediction (Embodiment 2).

For example, the first partition of the current block may refer to only motion information in the L0 direction of the merge candidate specified by the merge index (mergeIdx1), and the second partition may refer to only motion information in the L1 direction of the merge candidate specified by the merge index (mergeIdx2). However, when the merge candidate specified by mergeIdx1 does not have motion information in the L0 direction (that is, in the case of L1 prediction), the motion information in the L1 direction of the corresponding merge candidate may be referred to. Likewise, when the merge candidate specified by mergeIdx2 does not have motion information in the L1 direction (that is, in the case of L0 prediction), motion information in the L0 direction of the corresponding merge candidate may be referred to. Here, the first partition may mean a top partition of a diagonal line that divides the current block, and the second partition may mean a bottom partition.

Based on any one of the above-described Embodiments 1 or 2, uni-directional prediction may be forced. Alternatively, uni-directional prediction may be forced based on the combination of Embodiments 1 and 2 described above.

Referring to FIG. 4, inter prediction of a current block may be performed using the derived motion information (S420).

The pixel of the current block may be predicted using at least one of a first reference block (PP0) specified by a motion vector of a first partition or a second reference block (PP1) specified by a motion vector of a second partition. Depending on the position of the pixel in the current block, the pixel may be predicted by using only one of the first pixel of the first reference block or the second pixel of the second reference block, or by a weighted average of the first pixel of the first reference block and the second pixel of the second reference block. Here, the first pixel and the second pixel may be at the same position as the pixel of the current block to be predicted.

For example, the prediction block (PCUR) of the current block according to the present invention may be obtained as shown in Equation 3 below.

$$PCUR(x,y)=(PP0(x,y)\times MASKP0(x,y)+PP1(x,y)\times MASKP1(x,y)+\text{offset})>>\text{shift} \quad [\text{Equation 3}]$$

The PP0 and PP1 denote the reference blocks of the first and second partitions, respectively, MASKP0(x,y) and MASKP1(x,y) denote weights at (x,y) coordinates, and the sum of MASKP0(x,y) and MASKP1(x,y) must be equal to 2shift. The offset may be 0 or 2(shift−1).

Meanwhile, in the case of diagonal motion division, the pixel P(x1,y1) located on the diagonal line may be predicted by a weighted average of the pixel at the (x1,y1) position in the first partition and the pixel at the (x1,y1) position in the second partition. Likewise, the neighboring pixel P(x2,y2) of the pixel P(x1,y1) may be predicted by a weighted average of the pixel at the position (x2,y2) in the first partition and the pixel at the position (x2,y2) in the second partition. Alternatively, the neighboring pixel P(x2,y2) of the pixel P(x1,y1) may be predicted based on any one of the pixel at the position (x2,y2) in the first partition or the pixel at the position (x2,y2) in the second partition. In this case, the weight w1 applied to the pixel P(x1,y1) may be different from the weight w2 applied to the pixel P(x2,y2). The weighted prediction of the present invention will be described in detail with reference to FIGS. 8 and 9.

Figure 5:
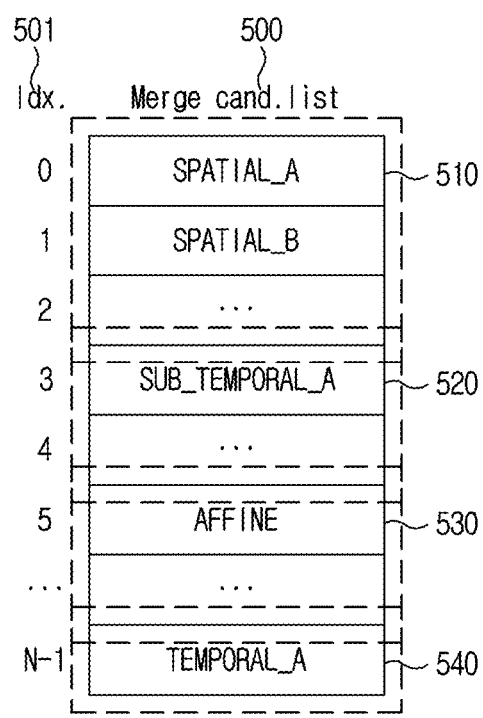
FIG. 5 is a diagram illustrating a conceptual diagram of a merge candidate list of a current block and its configuration.

FIG. 5 is a diagram showing a conceptual diagram of a merge candidate list of a current block and its construction.

According to an embodiment of the present invention, a merge candidate list may be constructed for a current block, and various types of merge candidates may be used.

In this case, the various types of merge candidates may include at least one of a spatially adjacent merge candidate and a temporally adjacent merge candidate, a sub-block-based merge candidate that divides a current block into into a plurality of sub-blocks and uses a temporally corresponding motion in each sub-block unit, or an affine transform merge candidate that calculates a motion vector for each of a plurality of sub-blocks within a block by using a motion vector at a specific position of the block and uses it.

The merge candidate of the current block may be determined differently depending on whether motion information of the current block is derived in units of sub-blocks. For example, when the motion information of the current block is derived in units of sub-blocks, the merge candidate list may include a sub-block-based merge candidate, an affine transform merge candidates, and the like. Otherwise, the merge candidate list may include a spatial merge candidate, a temporal merge candidate, and the like.

In constructing the merge candidate list, the construction order is not limited to the order shown in FIG. 5, and the construction order of the merge candidate list shown in FIG. 5 is an embodiment, and may be an order of a spatially adjacent merge candidate, a sub-block-based temporal merge candidate, an affine transform merge candidate, and a temporally adjacent merge candidate. Alternatively, the construction order of the merge candidate list may be an order of the spatially adjacent merge candidate, the affine transform merge candidate, the sub-block-based temporal merge candidate, and temporally adjacent merge candidate. Alternatively, the sub-block-based temporal merge candidate and the temporally adjacent merge candidate may be arranged between the spatially adjacent merge candidate and the affine transform merge candidate. Alternatively, the sub-block-based temporal merging candidate may be arranged before the spatially adjacent merging candidate or the temporally adjacent merging candidate. Alternatively, the sub-block-based temporal merge candidate may be arranged after the temporally adjacent merge candidate.

Figure 6:
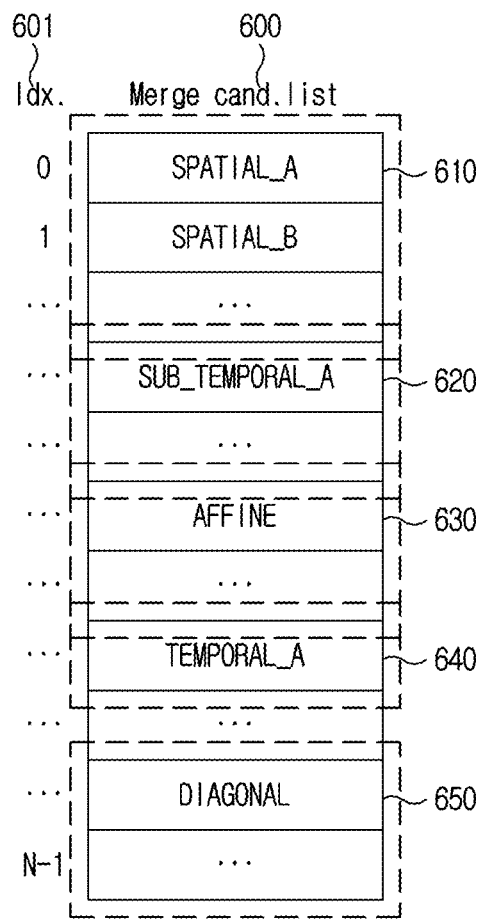
FIG. 6 is a diagram showing a conceptual diagram of a merge candidate list of a current block and its configuration.

FIG. 6 is a diagram showing a conceptual diagram of a merge candidate list of a current block and its construction.

According to an embodiment of the present invention illustrated in FIGS. 5 and 6, a merge candidate list may be constructed for a current block, and various types of merge candidates may be used.

In this case, the various types of merge candidates may include at least one of a spatially adjacent merge candidate, a temporally adjacent merge candidate, a sub-block-based merge candidate that divides a current block into into a plurality of sub-blocks and uses a temporally corresponding motion in each sub-block unit, or an affine transform merge candidate that calculates a motion vector for each of a plurality of sub-blocks within a block by using a motion vector at a specific position of the block and uses it.

In addition, as shown in FIG. 6, one or more diagonal motion divisions may be used as merge candidates of the current block.

When the diagonal motion division is selected as a merge candidate of the current block, the current block is divided into two partitions, and motion prediction and compensation are performed using different motion vectors for each partition.

In this case, the different motion vectors for each partition refer to motion vectors at a spatially and temporally adjacent position of the current block, and the corresponding motion vectors may be motion vectors configured in the same order as the merge candidate list constructed using an existing spatial merge candidate and a temporal merge candidate.

FIG. 7 is a diagram illustrating a concept of separately constructing a merge candidate list according to diagonal motion division.

FIG. 7 is a diagram illustrating a concept of separately constructing a merge candidate list unlike FIGS. 5 and 6.

According to FIG. 7, unlike FIGS. 5 and 6, a separate list for only merge candidates for diagonal motion division may be constructed to perform motion prediction and compensation using diagonal motion division.

In this case, it is necessary to signal whether to use the existing merge candidate list or the merge candidate list for diagonal motion division, which may be signaled in the form of a flag when the current block is encoded in the skip mode or the merge mode.

A diagonal merge candidate list 710 for diagonal motion division may be constructed separately from the existing merge candidate list 700.

In FIG. 7, the merge candidate list 710 for diagonal motion division has a merge candidate index 701 for each motion candidate 702, 703, 704, 705, same as the existing merge candidate list 700.

However, in an embodiment of the present invention, in the case of the merge candidate list 710 as shown in FIG. 7, merge candidates exists for each partition, and they are configured as one set for each partition, and different indexes for each set are used.

In this case, in constructing one motion candidate set, the motion for P0 and the motion for P1 must always be different from each other, and if the motions of P0 and P1 are the same, they are excluded from the diagonal motion merge candidate list.

Figure 8:
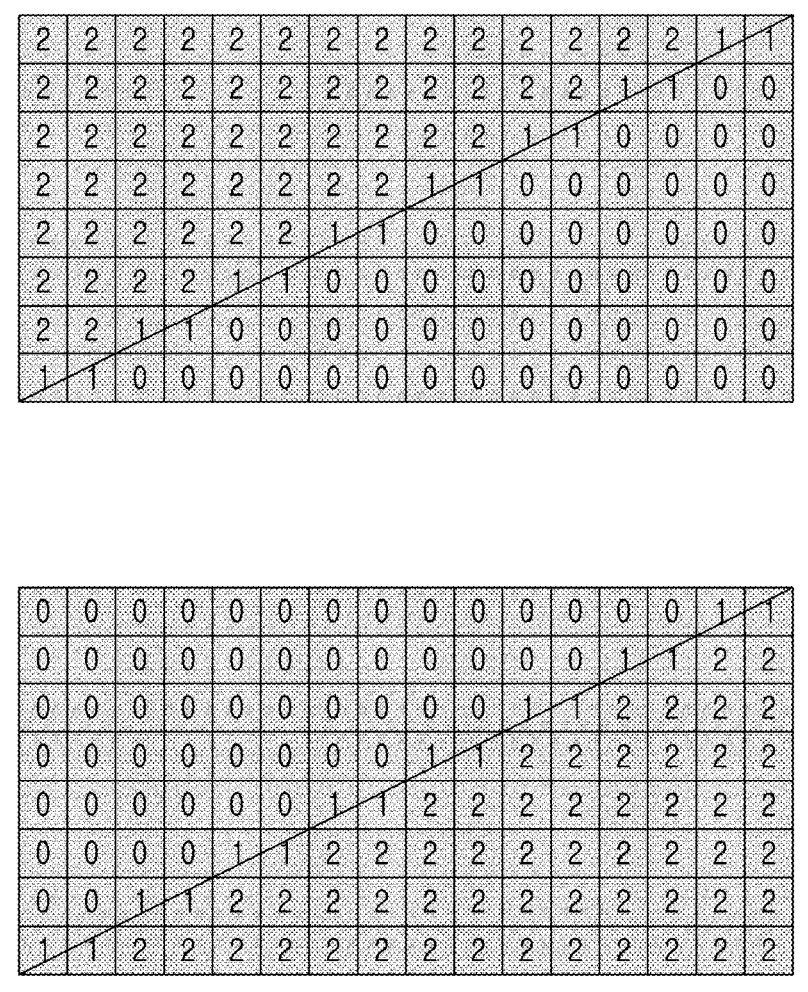

FIG. 8 is a diagram illustrating a concept of performing mask-based motion prediction and compensation for diagonal motion division shown in FIG. 3.

FIG. 8 shows an example in which a current block is divided into two partitions through diagonal motion division.

Specifically, the pixel P(x1, y1) (hereinafter referred to as a first region) located on the diagonal line may be predicted by applying a weight equal to 1 to each of a pixel at a position (x1,y1) in the reference block of the first partition and a pixel at a position (x1, y1) in the reference block of the second partition. The remaining pixels P(x2,y2) excluding the pixels belonging to the first region in the first partition may be predicted by applying a weight equal to 2 to the a pixel at a position (x2,y2) in the reference block of the first partition and by applying a weight equal to 0 to a pixel at a position (x2,y2) in the reference block of the second partition. That is, the pixel P(x2,y2) may be predicted as a pixel at a position (x2,y2) in the reference block of the first partition.

Meanwhile, the remaining pixels P(x3,y3) excluding the pixels belonging to the first region in the second partition may be predicted by applying a weight equal to 0 to a pixel at a position (x3,y3) in the reference block of the first partition and by applying a weight equal to 8 to a pixel at a position (x3,y3) in the reference block of the second partition. That is, the pixel P(x3,y3) may be predicted as a pixel at a position (x3,y3) in the reference block of the second partition.

As described above, the prediction pixel (predSample1) of the first partition and the prediction pixel (predSample2) of the second partition are obtained respectively, and a final prediction block is obtained by dividing the sum of predSample1 and predSample2 by the sum (i.e., 8) of weights applied to each of predSample1 and predSample2.

According to the embodiment shown in FIG. 8, the sum of the weight (w1) applied to the pixel of the first partition and the weight (w2) applied to the pixel of the second partition is 2, and in the process of reconstructing into a final square or rectangular prediction block, the pixel values at the corresponding positions are summed and divided by 2 to obtain a final predicted pixel value.

In the present invention, such a method is referred to as a mask-based motion prediction and compensation method, and may also include using various arbitrary shapes of masks.

If the diagonal motion division shown in FIG. 8 is configured in the form of a mask, it can be configured as in Equation 4.

[Equation 4]

$$MASK_{P0} = \begin{cases} 2, & \text{if } f(x, y) > 0, \\ 1, & \text{if } (x, y) = 0, \\ 0, & \text{otherwise,} \end{cases} \text{ and } MASK_{P1} = \begin{cases} 0, & \text{if } f(x, y) > 0, \\ 1, & \text{if } f(x, y) = 0 \\ 2, & \text{otherwise} \end{cases}$$

In Equation 4, $MASK_{P0}$ denotes the weight of the first partition, and $MASK_{P1}$ denotes the weight of the second partition. A method of generating the final square and rectangular prediction block using the weights of Equation 4 is as shown in Equation 5 below.

$$P_{DMP}(x,y) = (P_{P0}(x,y) \times MASK_{P0}(x,y) + P_{P1}(x,y) \times MASK_{P1}(x,y)) \gg shift \quad \text{[Equation 5]}$$

In Equation 5, $P_{DMP}$ means the final square and rectangular prediction block obtained using diagonal motion division, $P_{P0}(x,y)$ means a pixel value at a (x,y) position in the first partition, and $P_{P1}(x,y)$ means a pixel value at a (x,y) position in the second partition. Shift is the final shift value according to the weight, and since the weight shown in FIG. 8 is 2, the shift value in FIG. 2 is 1.

FIG. 9 is an embodiment to which another weight of the proposed mask-based block division method shown in FIG. 8 is applied.

FIG. 9 shows an embodiment in which the sum of the weight w1 and the weight w2 is 8, and unlike FIG. 8, it plays a role of reducing the boundary deterioration that may occur at the boundary of the division by using different weights not only for the pixels included in the diagonal line but also for the pixels in the region adjacent to the diagonal line. The adjacent region may include i pixels adjacent to the top or left direction and i pixels adjacent to the bottom or right direction from the pixel located on the diagonal line. Here, i may be 1, 2, 3, 4 or more, and may be variably determined according to the ratio (W/H) of the width and the height of the current block. For example, i may be set to the same value as W/H of the current block.

Embodiment 1

The pixel P(x1, y1) located on the diagonal line (hereinafter referred to as the first region) may be predicted by applying a weight of 4 to each of the pixel at the (x1,y1) position in the reference block of the first partition and the pixel at the (x1,y1) position in the reference block of the second partition. The top or left neighboring pixel P(x2, y2) of the first region (hereinafter referred to as the second region) may be predicted by applying a weight of 6 to the pixel at the (x2,y2) position in the reference block of the first partition and by applying a weight of 2 to the pixel at the (x2,y2) position in the reference block of the second partition. The top or left neighboring pixel P(x3, y3) of the second region (hereinafter referred to as the third region) may be predicted by applying a weight of 7 to the pixel at the (x3,y3) position in the reference block of the first partition and by applying a weight of 1 to the pixel at the (x3,y3) position in the reference block of the second partition. The remaining pixel P(x4,y4) excluding pixels belonging to the first to third regions in the first partition may be predicted by applying a weight of 8 to the pixel at the (x4,y4) position in the reference block of the first partition and by applying a weight of 0 to the pixel at the (x4,y4) position in the reference block of the second partition. That is, the pixel P(x4,y4) may be predicted as the pixel at a (x4,y4) position in the reference block of the first partition.

Meanwhile, the bottom or right neighboring pixel P(x5, y5) of the first region (hereinafter referred to as the fourth region) may be predicted by applying a weight of 2 to the pixel at the (x5,y5) position in the reference block of the first partition and by applying a weight of 6 to the pixel at the (x5,y5) position in the reference block of the second partition. The bottom or right neighboring pixel P(x6, y6) of the fourth region (hereinafter referred to as a fifth region) may be predicted by applying a weight of 1 to the pixel at the (x6,y6) position in the reference block of the first partition and by applying a weight of 7 to the pixel at the (x6,y6) position in the reference block of the second partition. The remaining pixel P(x7,y7) excluding pixels belonging to the first region, the fourth region and the fifth region in the second partition may be predicted by applying a weight of 0 to the pixel at the (x7,y7) position in the reference block of the first partition and by applying a weight of 8 to the pixel at the (x7,y7) position in the reference block of the second partition. That is, the pixel P(x7,y7) may be predicted as the pixel at the (x7,y7) position in the reference block of the second partition.

Embodiment 2

The pixel P(x1, y1) located on the diagonal line (hereinafter referred to as the first region) may be predicted by applying a weight of 4 to each of the pixel at the (x1,y1) position in the reference block of the first partition and the pixel at the (x1,y1) position in the reference block of the second partition. The top or left neighboring pixel P(x2, y2) of the first region (hereinafter referred to as the second region) may be predicted by applying a weight of 5 to the pixel at the (x2,y2) position in the reference block of the first partition and by applying a weight of 3 to the pixel at the (x2,y2) position in the reference block of the second partition. The top or left neighboring pixel P(x3, y3) of the second region (hereinafter referred to as the third region) may be predicted by applying a weight of 6 to the pixel at the (x3,y3) position in the reference block of the first partition and by applying a weight of 2 to the pixel at the (x3,y3) position in the reference block of the second partition. The top or left neighboring pixel P(x4, y4) of the third region (hereinafter referred to as the fourth region) may be predicted by applying a weight of 7 to the pixel at the (x4,y4) position in the reference block of the first partition and by applying a weight of 1 to the pixel at the (x4,y4) position in the reference block of the second partition. The remaining pixel P(x5,y5) excluding pixels belonging to the first to fourth regions in the first partition may be predicted by a weight of 8 to the pixel at the (x5,y5) position in the reference block of the first partition and by applying a weight of 0 to the pixel at the (x5,y5) position in the reference block of the second partition. That is, the pixel P(x5,y5) may be predicted as the pixel at the (x5,y5) position in the reference block of the first partition.

Meanwhile, the bottom or right neighboring pixel P(x6, y6) of the first region (hereinafter referred to as the fifth region) may be predicted by applying a weight of 3 to the pixel at the (x6,y6) position in the reference block of the first partition and by applying a weight of 5 to the pixel at the (x6,y6) position in the reference block of the second partition. The bottom or right neighboring pixel P(x7, y7) of the fifth region (hereinafter referred to as a sixth region) may be predicted by applying a weight of 2 to the pixel at the (x7,y7) position in the reference block of the first partition and by applying a weight of 6 to the pixel at the (x7,y7) position in the reference block of the second partition. The bottom or right neighboring pixel P(x8, y8) of the sixth region (hereinafter referred to as a seventh region) may be predicted by applying a weight of 1 to the pixel at the (x8,y8) position in the reference block of the first partition and by applying a weight of 7 to the pixel at the (x8,y8) position in the reference block of the second partition. The remaining pixel P(x9,y9) excluding pixels belonging to the first region and the fifth to seventh regions in the second partition may be predicted by applying a weight of 0 to the pixel at the (x9,y9) position in the reference block of the first partition and by applying a weight of 8 to the pixel at the (x9,y9) position in the reference block of the second partition. That is, the pixel P(x9,y9) may be predicted as the pixel at the (x9,y9) position in the reference block of the second partition.

As described in FIGS. 8 and 9, the current block may be divided into k regions, and different weights may be applied according to the region to which the pixel belongs. Here, k may be 3, 5, 7, 9 or more.

The k may be determined based on an index encoded and signaled by an encoding apparatus. The index may specify at least one of a weight set, the number of weights for each weight set, or a sum of weights (w1+w2). As described above, the weight set may be at least one of a first weight set consisting of three weights ([2:0], [1:1], [0:2]), a second weight set consisting of seven weights ([8:0], [7:1], [6:2], [4:4], [2:6], [1:7], [0:8]) or a third weight set of consisting of nine weights ([8:0], [7:1], [6:2], [5:3], [4:4], [3:5], [2:6], [1:7], [0:8]). For example, if the index is a first value, the first weight set may be applied, otherwise, the second or third weight set may be applied. Alternatively, if the index is a second value, the second weight set may be applied, otherwise, the third weight set may be applied.

Alternatively, k may be determined based on encoding parameters such as the size, shape, or division type of the current block. For example, if at least one of the width or height of the current block is less than a predetermined threshold size, Embodiment 1 may be applied, otherwise, Embodiment 2 may be applied.

As described above, the prediction pixel (predSample1) of the first partition and the prediction pixel (predSample2) of the second partition are obtained, respectively, and the final prediction block is obtained by dividing the sum of predSample1 and predSample2 by the sum of weights applied to each of predSample1 and predSample2 (i.e., 8).

In addition, the present invention includes using different weights according to the size of the block. In an embodiment, when the size of a block is less than a predetermined threshold size, motion prediction and compensation are performed using the mask shown in FIG. 8, and when the size of the block is greater than or equal to the threshold size, motion prediction and compensation are performed using one mask shown in FIG. 9. Here, the size of the block may be understood as the width or height of the block, the sum of the width and the height, the product of the width and the height, the minimum/maximum value of the width and the height, the ratio of the width and the height, and the like. The threshold size may be 1, 2, 4, 8, 16, 32, 64, 128, 256 or more.

The above-mentioned size of the block is one embodiment, and it is included in the scope of the present invention to perform prediction and compensation using different masks according to the sizes of various blocks as in the above embodiment.

Various embodiments of the present disclosure are not listed in all possible combinations, but are intended to describe representative aspects of the present disclosure, and matters described in the various embodiments may be applied independently or may be applied in combination of two or more.

In addition, various embodiments of the present disclosure such as the various units represented by a block in FIGS. 1 and 2 may be implemented by hardware, firmware, software, or a combination thereof. For implementation by hardware, it may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processor (general processor), a controller, a microcontroller, a microprocessor, or etc.

The scope of the present disclosure includes software or machine-executable instructions (e.g., operating systems, applications, firmware, programs, etc.) that allow an operation according to a method of various embodiments to be executed on a device or computer, and a non-transitory computer-readable medium (non-transitory computer-readable medium) which stores such software or instructions and is executable on a device or a computer.

INDUSTRIAL APPLICABILITY

The present invention may be used to encode/decode a video signal.

The invention claimed is:
1. A method of decoding a video, comprising:
constructing a merge candidate list of a current block in the video, the merge candidate list including a plurality of merge candidates;
deriving motion information of the current block based on the merge candidate list;
generating a final prediction block of the current block by performing inter prediction of the current block using the motion information; and
reconstructing the current block based on the final prediction block,
wherein the current block is divided, based on a predetermined division line, into a plurality of partitions including a first partition and a second partition,
wherein at least one of the first partition or the second partition has a triangular shape,
wherein the merge candidate list includes at least one of a spatial merge candidate or a temporal merge candidate,
wherein a pixel of the final prediction block is predicted based on at least one of a first prediction block or a second prediction block of the current block,
wherein the motion information of the current block is derived for each of the first partition and the second partition,
wherein the first prediction block is obtained based on the motion information of the first partition and the second prediction block is obtained based on the motion information of the second partition,
wherein a pixel at a first position in the current block is predicted based on only one of a pixel at the first position in the first prediction block or a pixel at the first position in the second prediction block,
wherein a pixel at a second position in the current block is predicted based on a weighted sum of a pixel at the second position in the first prediction block and a pixel at the second position in the second prediction block,
wherein a weight for the weighted sum includes a first weight for the pixel at the second position in the first prediction block and a second weight for the pixel at the second position in the second prediction block,
wherein based on the pixel at the second position being a pixel located on the division line, both the first weight and the second weight are determined as 4, and
wherein based on the pixel at the second position being a neighboring pixel diagonally adjacent to the pixel located on the division line, the first weight is determined as one of 2 or 6 and the second weight is determined as the other one of 2 or 6.

2. The method of claim 1, wherein the division is performed based on a flag indicating whether to divide the current block into the plurality of partitions.

3. The method of claim 2, wherein the flag is derived based on a predetermined encoding parameter, and
wherein the encoding parameter includes at least one of a slice type, a type of an inter mode, a block size/shape, or a ratio of a width and a height of a block.

4. The method of claim 1, wherein the first partition and the second partition belonging to the current block share the constructed merge candidate list.

5. The method of claim 4, wherein the motion information is derived based on a merge index of the current block, and
wherein the merge index is signaled, from an encoding apparatus, for each of the first partition and the second partition.

6. A method of encoding a video, comprising:
constructing a merge candidate list of a current block in the video, the merge candidate list including a plurality of merge candidates; and
generating a final prediction block of the current block by performing inter prediction of the current block based on motion information from the merge candidate list,
wherein the current block is divided, based on a predetermined division line, into a plurality of partitions including a first partition and a second partition,
wherein at least one of the first partition or the second partition has a triangular shape,
wherein the merge candidate list includes at least one of a spatial merge candidate or a temporal merge candidate,
wherein a pixel of the final prediction block is predicted based on at least one of a first prediction block or a second prediction block of the current block,
wherein the motion information of the current block is determined for each of the first partition and the second partition,
wherein the first prediction block is obtained based on the motion information of the first partition and the second prediction block is obtained based on the motion information of the second partition,
wherein a pixel at a first position in the current block is predicted based on only one of a pixel at the first position in the first prediction block or a pixel at the first position in the second prediction block,
wherein a pixel at a second position in the current block is predicted based on a weighted sum of a pixel at the second position in the first prediction block and a pixel at the second position in the second prediction block,
wherein a weight for the weighted sum includes a first weight for the pixel at the second position in the first prediction block and a second weight for the pixel at the second position in the second prediction block,
wherein based on the pixel at the second position being a pixel located on the division line, both the first weight and the second weight are determined as 4, and
wherein based on the pixel at the second position being a neighboring pixel diagonally adjacent to the pixel located on the division line, the first weight is determined as one of 2 or 6 and the second weight is determined as the other one of 2 or 6.

7. A non-transitory computer-readable storage medium for storing a bitstream generated by an image encoding method, the image encoding method comprising:
constructing a merge candidate list of a current block, the merge candidate list including a plurality of merge candidates; and
generating a final prediction block of the current block by performing inter prediction of the current block based on motion information from the merge candidate list,
wherein the current block is divided, based on a predetermined division line, into a plurality of partitions including a first partition and a second partition,
wherein at least one of the first partition or the second partition has a triangular shape, wherein the merge candidate list includes at least one of a spatial merge candidate or a temporal merge candidate, wherein a pixel of the final prediction block is predicted based on at least one of a first prediction block or a second prediction block of the current block, wherein the motion information of the current block is determined for each of the first partition and the second partition, wherein the first prediction block is obtained based on the motion information of the first partition and the second prediction block is obtained based on the motion information of the second partition, wherein a pixel at a first position in the current block is predicted based on only one of a pixel at the first position in the first prediction block or a pixel at the first position in the second prediction block, wherein a pixel at a second position in the current block is predicted based on a weighted sum of a pixel at the second position in the first prediction block and a pixel at the second position in the second prediction block, wherein a weight for the weighted sum includes a first weight for the pixel at the second position in the first prediction block and a second weight for the pixel at the second position in the second prediction block, wherein based on the pixel at the second position being a pixel located on the division line, both the first weight and the second weight are determined as 4, and wherein based on the pixel at the second position being a neighboring pixel diagonally adjacent to the pixel located on the division line, the first weight is determined as one of 2 or 6 and the second weight is determined as the other one of 2 or 6.

* * * * *